United States Patent [19]

Zwick

[11] E Re. 29,532

[45] Reissued Feb. 7, 1978

[54] VAULT

[76] Inventor: William H. Zwick, 415 N. Second St., Decatur, Ind. 46733

[21] Appl. No.: 766,713

[22] Filed: Feb. 8, 1977

Related U.S. Patent Documents

Reissue of:

[64] Patent No.: 3,983,667
Issued: Oct. 5, 1976
Appl. No.: 540,979
Filed: Jan. 14, 1975

[51] Int. Cl.[2] ..... E04H 13/00

[52] U.S. Cl. ..... 52/140; 49/466; 220/378

[58] Field of Search ..... 52/140, 141, 135, 139, 52/169.1, 169.6, 169.14, 128, 136, 137; 49/463–466, 475, 488, 489; 61/69; 220/221, 224, 327, 328, 378; 109/1 S

[56] References Cited

U.S. PATENT DOCUMENTS

| | | | |
|---|---|---|---|
| 481,370 | 8/1892 | Pruser | 52/139 |
| 1,327,965 | 1/1920 | Rotter | 220/328 |
| 1,403,579 | 1/1922 | Tassell | 52/139 |

FOREIGN PATENT DOCUMENTS

| | | | |
|---|---|---|---|
| 668,029 | 7/1929 | France | 52/140 |

*Primary Examiner*—J. Karl Bell
*Attorney, Agent, or Firm*—Jenkins, Coffey & Hyland

[57] ABSTRACT

[A burial] *An underground* vault formed from concrete which includes a hollow chamber having an open end closed by an end plate connected to said chamber by a plurality of bolts. [An annular] *A* resilient seal is interposed between said end plate and the adjacent chamber end. Said seal is fixedly connected to said end plate and is bindingly retained between said end plate and chamber by said bolts connecting said end plate to said chamber.

5 Claims, 5 Drawing Figures

Fig. 1
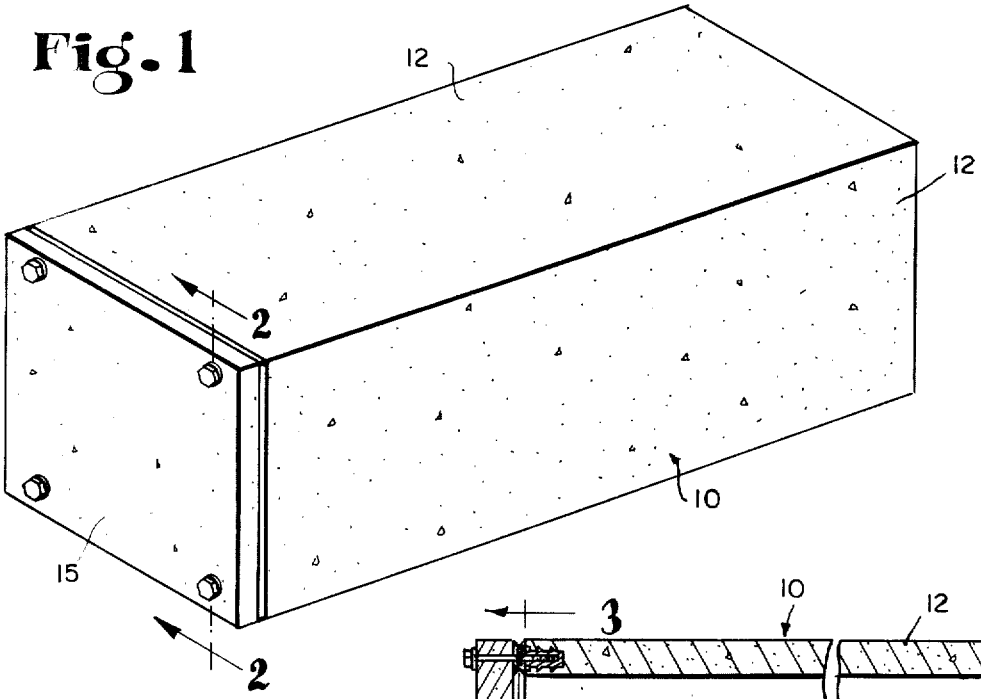
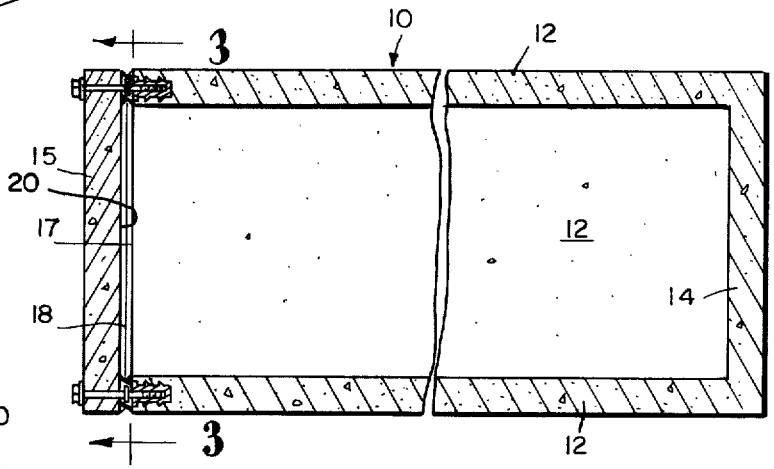
Fig. 2
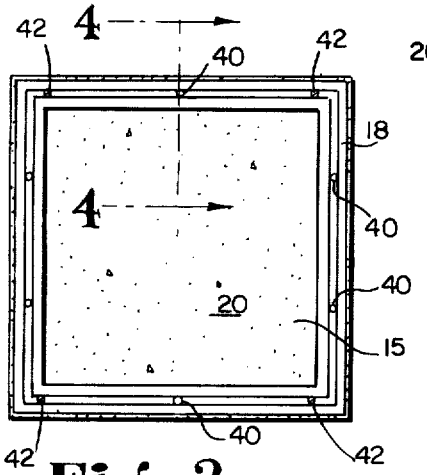
Fig. 3
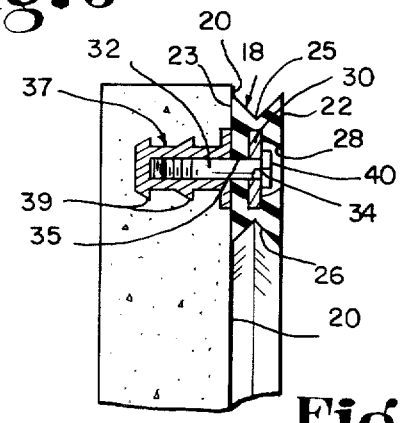
Fig. 4
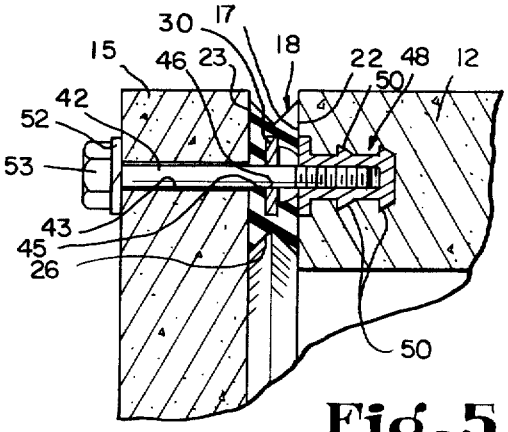
Fig. 5

VAULT

Matter enclosed in heavy brackets [ ] appears in the original patent but forms no part of this reissue specification; matter printed in italics indicates the additions made by reissue.

BACKGROUND OF THE INVENTION

Because of its relatively low cost, strength characteristics, resistance to deterioration by moisture, concrete is substantially universally used in the construction of burial vaults. It has been a conventional practice in the construction of such vaults to form a slab which is placed in the ground in a horizontal orientation with the casket placed upon it. A domed cover is then placed over the casket with its lower edges resting upon the marginal edges of the slab. The slab and dome may be provided with mating keys and keyways to form an interlock between said dome and slab and to form a weir to prevent moisture from entering the vault.

Conventional concrete molding techniques, however, do not make it possible to obtain a perfect fit between the vault dome and slab. Consequently, even though a sealing material is interposed between edges of the dome and slab, moisture frequently enters the closed vault.

It is an object of this invention to provide an improved [burial] *underground* vault construction which will overcome the difficulties and disadvantages of the prior art vault structures. More specifically, it is an object of this invention to provide [a burial] *an underground* vault which can be sealed to prevent moisture from entering it in spite of irregularities in the vault components created during the molding of said components.

SUMMARY OF THE INVENTION

In accordance with one form of the invention, there is provided an elongated hollow chamber formed from concrete and open at one of its ends. The open end of said chamber is closed by an end plate also formed of concrete and rigidly connected to said chamber by a plurality of first bolts extending through said plate and received in said chamber.

[An annular] *A* resilient seal is interposed between the end plate and the adjacent end face of the chamber. Grooves extend around a pair of opposed faces of the seal to help prevent moisture from entering between the seal and the adjacent chamber end face. [An annular] *A* rim formed of a rigid material is carried in the seal, and a plurality of second bolts extend through said rim and are received in said end plate for fixedly mounting the seal on the end plate until said end plate is rigidly connected to the chamber.

The accompanying drawings illustrate the invention. In such drawings:

FIG. 1 is a perspective view of [a burial] *an underground* vault embodying the invention;

FIG. 2 is an enlarged fragmentary vertical section taken on the line 2—2 of FIG. 1;

FIG. 3 is a vertical section taken on the line 3—3 of FIG. 2;

FIG. 4 is an enlarged fragmentary vertical section taken on the line 4—4 of FIG. 3; and FIG. 5 is an enlarged fragmentary vertical section showing the interconnection of end plate to the chamber.

DETAILED DESCRIPTION OF THE PREFERRED EMBODIMENT

As shown in FIGS. 1 and 2, my [burial] *underground* vault comprises an elongated hollow chamber 10 formed from concrete. The four interconnected side walls 12 of the chamber define an elongated generally rectangular opening with the bottom one of said side walls being adapted to support a casket (not shown) thereon. The side walls 12 are interconnected at one of their ends, and thus the chamber is closed at said one end, by an end wall 14 integrally molded to said side walls.

The open end of the chamber is closed by a generally rectangular end plate 15 also formed of concrete and rigidly connected to the open end of the chamber 10 in the manner hereinafter described. Because of the lack of precision which can be achieved in the molding of concrete products, it is difficult to connect the end plate 15 to the end face 17 of chamber 10 in a water tight engagement. Therefore, I provide between the chamber end face 17 and the adjacent face 20 of end plate 15 [an annular] *a* seal 18 formed from a resilient material, such as rubber or the like. As shown in FIGS. 4 and 5, the seal 18 has a pair of side faces 22 and 23 adapted to abut the adjacent chamber and plate faces 17 and 20, respectively. The outer and inner faces of said seal have opposed grooves 25 and 26 formed therein and extending therearound which form a pair of opposed [wires] *weirs* to thereby prevent the flow of liquid around said seal.

As shown in FIG. 4, an opening 28 extends inwardly from the seal side face 22, and rigid [annular] rim 30 is carried within said opening. In order to mount the seal 18 on the end plate 15, a plurality of bolts 32 extend through aligned openings 34 and 35 longitudinally spaced along the rim and seal, respectively. The bolts 32 are received in cylindrically shaped threaded sockets 37 molded into the end plate. As shown in FIG. 4, the sockets 37 are mounted flush with the plate face 20 and are provided with a plurality of radially extending projections 39 along their lengths for securing said sockets in a fixed position in the end plate 15. The bolts 32 are mounted in the seal 18 such that their heads 40 are disposed well inwardly from the seal face 22. Thus, the rim 30 and bolts 32 fixedly mount the seal on the end plate 15 in a position such that it will be disposed in alignment with the chamber end face 17 when the end plate is mounted thereon.

As shown in FIG. 5, the end plate 15 is mounted on chamber 10 by a plurality of bolts 42. Each of said bolts extends through aligned openings 43, 45 and 46 in the end plate, seal, and rim, respectively, and is received in a threaded socket 48 molded into the chamber end face 17. Each of the sockets 48, like the sockets 37, is mounted flush with the end face 17 and is provided with a plurality of projections along its length 50 for securing it in a fixed position in said chamber. Desirably, washers 52 can be interposed between the outer face of the end plate 15 and the heads 53 on bolts 42.

Thus, as the bolts 42 are drawn up into the sockets 48, the seal 18 between the adjacent faces 17 and 20 of the chamber and end plate will be compressed. The compressed seal 18 will thus prevent moisture from entering the chamber 10 between the plate and chamber faces 20 and 17.

While the invention has been shown and described as employing a chamber having an integral end wall 14 and a single end plate 15, it is to be understood, of course, that the chamber can be open at both of its ends and closed by a pair of said end plates.

I claim:

1. [A burial] *An underground* vault, comprising an elongated hollow chamber having at least one open end, an end plate closing said open end, [an annular] *a* resilient seal interposed between said chamber and end plate for sealing the space therebetween, said seal having a pair of opposed side faces in engagement with said end plate and chamber and inner and outer faces extending between said side faces, said inner and outer faces having opposed grooves formed therein and extending the lengths of said inner and outer faces, means in said seal for retaining said seal in its [annular] configuration, connecting means for rigidly connecting said end plate to said chamber, and means for fixedly mounting said seal on said end plate.

2. [A burial] *An underground* vault comprising an elongated hollow chamber having at least one open end, an end plate closing said open end, [an annular] *a* resilient seal interposed between said chamber and end plate for sealing the space therebetween, said seal having a pair of opposed side faces in engagement with said end plate and chamber and inner and outer faces extending between said side faces, said inner and outer faces having opposed grooves formed therein and extending the lengths of said inner and outer faces, a rigid rim carried in said seal, a plurality of first bolts extending through said end plate, rim, and seal and received in said chamber for rigidly interconnecting said end plate to said chamber, and a plurality of second bolts extending through said rim and seal and received in said end plate for fixedly mounting said seal on said end plate.

3. [A burial] *An underground* vault, comprising a concrete chamber having a plurality of side walls interconnected at one of their ends by an end wall and open at their opposite end, a concrete end plate closing said opposite end, [an annular] *a* resilient seal interposed between the adjacent faces of said end plate and chamber, the adjacent faces of said end plate and chamber each having a plurality of threaded sockets mounted therein, a rigid [annular] rim carried in said seal, a plurality of first bolts extending through said end plate, rim and seal and received in the sockets in said chamber for mounting said end plate on said chamber, and a plurality of second bolts extending through said rim and seal and received in the sockets in said end plate.

4. [A burial ] *An underground* vault as set forth in claim 3 in which said sockets are mounted flush with the adjacent faces of said end plate and chamber.

5. [A burial] *An underground* vault as set forth in claim 3 in which said sockets have a cylindrical shape and are mounted in said end plate and chamber flush with said adjacent faces, each of said sockets having a plurality of radially extending projections thereon.

* * * * *